(12) United States Patent
Moghaddam et al.

(10) Patent No.: US 7,426,292 B2
(45) Date of Patent: Sep. 16, 2008

(54) METHOD FOR DETERMINING OPTIMAL VIEWPOINTS FOR 3D FACE MODELING AND FACE RECOGNITION

(75) Inventors: Baback Moghaddam, Cambridge, MA (US); Hanspeter Pfister, Arlington, MA (US); Jinho Lee, Columbus, OH (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 1050 days.

(21) Appl. No.: 10/836,004

(22) Filed: Apr. 30, 2004

(65) Prior Publication Data

US 2005/0031196 A1 Feb. 10, 2005

Related U.S. Application Data

(63) Continuation-in-part of application No. 10/636,355, filed on Aug. 7, 2003, now Pat. No. 7,212,664.

(51) Int. Cl.
*G06K 9/00* (2006.01)
(52) U.S. Cl. .............. 382/154; 382/225; 382/285; 382/294; 345/419; 345/423; 348/42
(58) Field of Classification Search ................ 382/154, 382/285, 194, 190, 225; 348/42, E13.015, 348/E13.062, E13.071, E13.023, E13.059, 348/E5.022, 159, E13.014, E13.019; 345/419, 345/420, 427, 582, 421, 423, 426, 586, 424, 345/422; 715/757; 353/10, 109, 119
See application file for complete search history.

(56) References Cited

U.S. PATENT DOCUMENTS

| | | | | |
|---|---|---|---|---|
| 5,524,396 A | * | 6/1996 | Lalvani | 52/81.1 |
| 5,748,199 A | * | 5/1998 | Palm | 345/473 |
| 5,991,437 A | * | 11/1999 | Migdal et al. | 382/154 |
| 6,141,034 A | * | 10/2000 | McCutchen | 348/36 |
| 6,152,739 A | * | 11/2000 | Amery et al. | 434/38 |
| 6,307,555 B1 | * | 10/2001 | Lee | 345/423 |
| 6,792,398 B1 | * | 9/2004 | Handley et al. | 703/2 |
| 6,807,286 B1 | * | 10/2004 | Krumm et al. | 382/103 |
| 6,831,640 B2 | * | 12/2004 | Shih et al. | 345/419 |
| 6,879,324 B1 | * | 4/2005 | Hoppe | 345/423 |

OTHER PUBLICATIONS

V. Blanz and T. Vetter. Face recognition based on fitting a 3D morphable model. *PAMI*, 25(9), 2003.
C. M. Cyr and B. B. Kimia. 3D object recognition using shape similarity-based aspect graph. In *Proc. of ICCV*, pp. 254-261, 2001.
P. Fua. Regularized bundle-adjustment to model heads from image sequences without calibration data. *International Journal of Computer Vision*, 38(2):153-171, 2000.

(Continued)

*Primary Examiner*—Sheela C Chawan
(74) *Attorney, Agent, or Firm*—Dirk Brinkman; Clifton D. Mueller; Gene V. Vinokur

(57) ABSTRACT

A method determines an optimal set of viewpoints to acquire a 3D shape of a face. A view-sphere is tessellated with a plurality of viewpoint cells. The face is at an approximate center of the view-sphere. Selected viewpoint cells are discarded. The remaining viewpoint cells are clustered to a predetermined number of viewpoint cells according to a silhouette difference metric. The predetermined number of viewpoint cells are searched for a set of optimal viewpoint cells to construct a 3D model of the face.

21 Claims, 6 Drawing Sheets

OTHER PUBLICATIONS

J. Lee, B. Moghaddam, H. Pfister, and R. Machiraju. Silhouette-based 3D face shape recovery. In *Proc. of Graphics Interface*, pp. 21-30, 2003.

K. Lee, J. Ho, and D. Kriegman. Nine points of light: Acquiring subspaces for face recognition under variable lighting. In *Proc. of CVPR*, pp. 519-526, 2001.

B. Moghaddam, J. Lee, H. Pfister, and R. Machiraju. Modelbased 3D face capture using shape-from-silhouettes. In *Proc. of Advanced Modeling of Faces & Gestures*, 2003.

Y. Shan, Z. Liu, and Z. Zhang. Model-based bundle adjustment with application to face modeling. In *Proceedings of ICCV 01*, pp. 644-651, Jul. 2001.

F. Pighin, J. Hecker, D. Lischinski, R. Szeliski, and D. Salesin. Synthesizing realistic facial expressions from photographs. In *Proceedings of SIGGRAPH 98*, 1998.

\* cited by examiner

METHOD FOR DETERMINING OPTIMAL VIEWPOINTS FOR 3D FACE MODELING AND FACE RECOGNITION

RELATED APPLICATION

This is a Continuation-in-Part Application of U.S. patent application Ser. No. 10/636,355 "Reconstructing Heads from 3D Models and 2D Silhouettes," filed on Aug. 7, 2003 now U.S. Pat. No. 7,212,664, by Lee et al.

FIELD OF THE INVENTION

This invention relates generally to image processing, and more particularly to modeling and recognizing faces according to 3D models and 2D images.

BACKGROUND OF THE INVENTION

In computer graphics, it is still a fundamental problem to synthetically construct realistic human heads, particularly the face portion. Hereinafter, when referring to 'head' or 'face', the invention is most interested in that portion of the head extending from chin-to-brow, and ear-to-ear. Most prior art methods require either extensive manual labor by skilled artists, expensive active 3D scanners, Lee et al., "Realistic Modeling for Facial Animations," Proceedings of SIG-GRAPH 95, pages 55-62, August, 1995, or the availability of high quality of texture images as a substitute for exact face geometry, see Guenter et al., "Making Faces," Proceedings of SIGGRAPH 98, pages 55-66, July 1998, Lee et al., "Fast Head Modeling for Animation," Image and Vision Computing, Vol. 18, No. 4, pages 355-364, March 2000, Tarini et al., "Texturing Faces," Proceedings Graphics Interface 2002, pages 89-98, May 2002.

To acquire 3D models for human faces by active sensing requires costly scanning devices. Therefore, a number of techniques have been developed to recover the 3D shape of faces from 2D images or 'projections'. Some of those methods are based on a direct approach, which obtains 3D location of reference points on the face using dense 2D correspondences of the images, P. Fua, "Regularized bundle-adjustment to model heads from image sequences without calibration data," *International Journal of Computer Vision*, 38(2) pp. 153-171, 2000, F. Pighin, J. Hecker, D. Lischinski, R. Szeliski, and D. Salesin, "Synthesizing realistic facial expressions from photographs," *Proceedings of SIGGRAPH* 98, 1998. and Y. Shan, Z. Liu, and Z. Zhang, "Model-based bundle adjustment with application to face modeling," *Proceedings of ICCV* 01, pp. 644-651, July 2001.

Other methods parameterize 3D face models, and search for optimal parameters that best describe the 2D input images, V. Blanz and T. Vetter, "Face recognition based on fitting a 3D morphable model," *PAMI*, 25(9), 2003, J. Lee, B. Moghaddam, H. Pfister, and R. Machiraju, "Silhouette-based 3D face shape recovery," *Proc. of Graphics Interface*, pp. 21-30, 2003, and B. Moghaddam, J. Lee, H. Pfister, and R. Machiraju. "Model-based 3D face capture using shape-from-silhouettes," *Proc. of Advanced Modeling of Faces & Gestures*, 2003.

In either case, the number of viewpoints and 2D input images is an important parameter for high quality 3D model reconstruction. Intuitively, the more input images that are taken from different viewpoints, the higher the quality of the 3D model and subsequent reconstructions. But, that increases processing time and the cost of equipment.

However, if an optimal set of viewpoints can be determined, then it becomes possible to use a smaller number of cameras and their resulting 2D images provide better 3D modeling accuracy.

Up to now, a systemic method for determining the optimal number of viewpoints and, thus, input images, for the purpose of constructing a 3D model of a face has not been available. It would also be advantageous to select automatically specific images out of a sequence of images in a video, the selected images corresponding to optimal viewpoints to improve face recognition.

It is known that different objects have different prototype or aspect viewpoints, C. M. Cyr and B. B. Kimia, "Object recognition using shape similarity-based aspect graph," *Proc. of ICCV*, pp. 254-261, 2001.

It is desired to determine a canonical set of optimal viewpoints for a specific class of objects with notably high intra-class similarity, specifically the human face.

When dealing just with illumination, it is possible to determine empirically an optimal configuration of nine point sources of light which span a generic subspace of faces under variable illumination, K. Lee, J. Ho, and D. Kriegman, "Nine points of light: Acquiring subspaces for face recognition under variable lighting," *Proc. of CVPR*, pp, 519-526, 2001.

It is desired to solve a related problem for subject pose, or equivalently camera viewpoint. That is, it is desired to determine an optimal set of K viewpoints corresponding to a spatial configuration of K cameras that best describe a 3D human face by way of projections from the viewpoints, i.e., shape silhouettes in 2D images.

SUMMARY OF THE INVENTION

A fundamental problem in multi-view 3D face modeling is to determine a set of optimal viewpoints or 'poses' required for accurate 3D shape estimation of a 'generic' face. Up to now, there is no analytical solution to this problem. Instead partial solutions require a near exhaustive combinatorial search.

Based on a 3D modeling method, the invention uses a contour-based silhouette matching method and extends the method by aggressive pruning of a view-sphere with viewpoint clustering, and various other imaging constraints. A multi-view optimization search is performed using both model-based (eigenheads) and data-driven (visual hull) methods, yielding comparable sets of optimal viewpoints.

The set of optimal viewpoints can be used for acquiring the 3D shape of faces, and provide useful empirical guidelines for the design of 3D face recognition systems.

Because no analytical formulation is possible, the invention uses an empirical approach. The view-sphere about the object is sampled (tessellated) to generate a finite set of viewpoint configurations. Each viewpoint is evaluated according to a resulting ensemble error on a representative dataset of individual faces. The ensemble error is in terms of an average reconstruction error.

Due to the large number of potential viewpoints, the view-sphere is pruned aggressively by discarding a predetermined set of irrelevant or impractical viewpoints, which can depend on the application. The invention can use aspect viewpoints for general 3D object recognition. An aspect viewpoint is a projection of a silhouette of an object from a viewpoint, which represents a range of similar nearby viewpoints in a space of the uniformly sampled view-sphere. However, the invention is not limited to using aspect views as such, because the method can work with any set of pre-determined views that are deemed to be salient.

A size of the viewpoint space is reduced for a class of objects, e.g., faces. After uniformly sampling the view-sphere and applying high-level model-specific constraints, such as facial symmetry and imaging geometry, the method generates viewpoint clusters by merging nearby viewpoint cells using a silhouette difference metric, or inversely, a similarity metric, and selects prototypical "centroids" of each cluster as aspect viewpoints. A search of the reduced number the combinatorial subsets of these aspect viewpoints for a given number of distinct views (cameras) then constitutes the set of optimal viewpoints for modeling the shape of the object.

DETAILED DESCRIPTION OF THE PREFERRED EMBODIMENTS

Multi-View 3D Face Modeling

Our present invention provides a method for determining an optimal set of viewpoints required to construct an accurate 3D model of a human face acquired from 2D images taken from the set of viewpoints. Our general method for constructing the 3D model is described in U.S. patent application Ser. No. 10/636,355 "Reconstructing Heads from 3D Models and 2D Silhouettes," filed on Aug. 7, 2003, by Lee et al, incorporate herein by reference.

Figure 6:
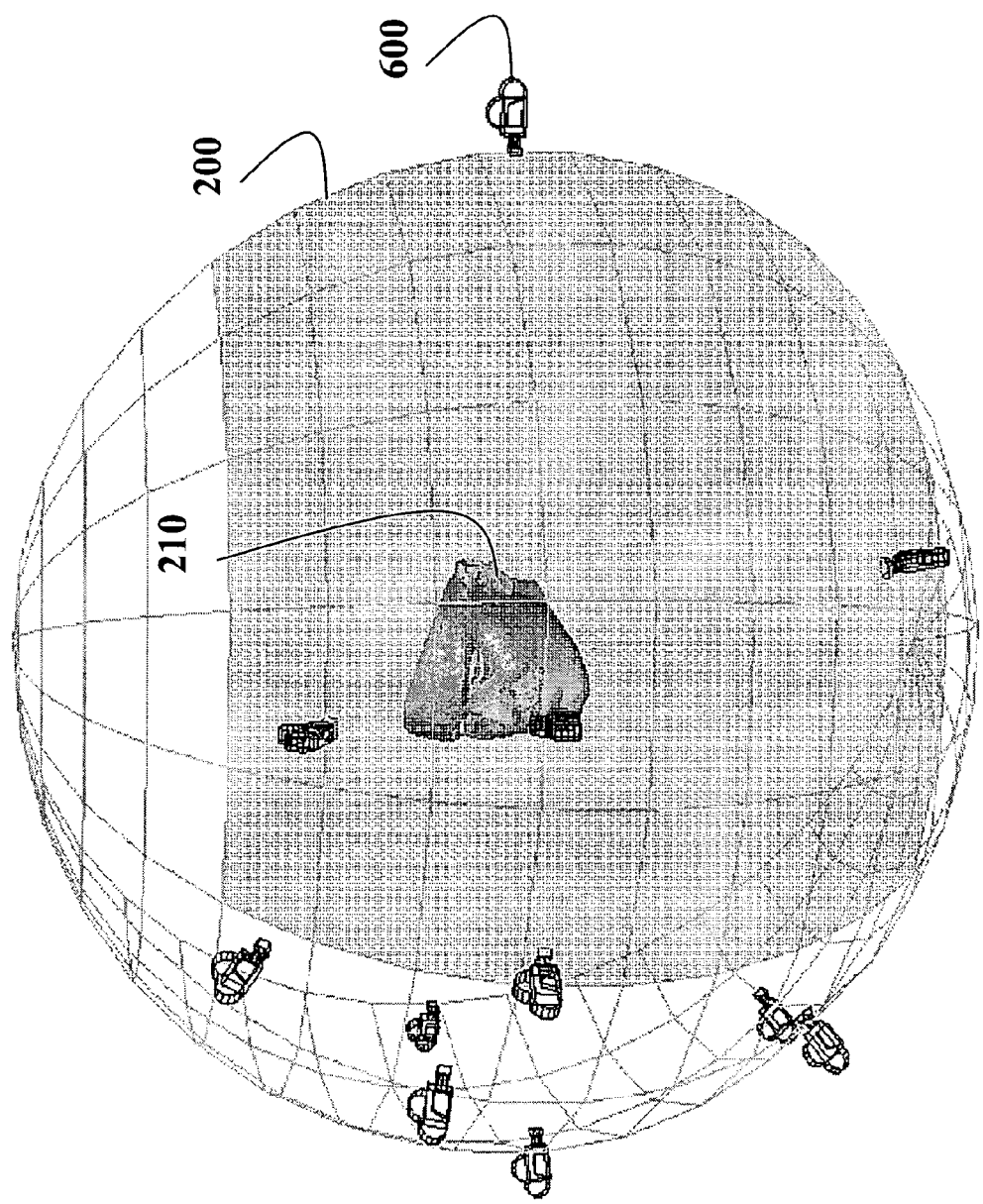
FIG. 6 is a diagram of a view-sphere according to the invention.

As shown in FIG. 6, our method uses an arrangement of many cameras 600, e.g., eleven, placed on 'view-sphere' 200 around a person's head 210. The placement of the cameras determines the size of the portion of the head that is modeled. In actual practice, the view-sphere is constructed as a geodesic dome with the cameras fitted to the structural members of the dome. The person sits inside the dome on a chair while images are acquired of the person's face. The face 210 is at an approximate center of the view-sphere 200.

As described therein, our 3D modeling method treats the recovery of shape, i.e., geometry, independently of texture, i.e., appearance. Hence, our method is robust with respect to variations in lighting and texture. Our method is distinguishable from the 'morphable' models, V. Blanz and T. Vetter, "Face recognition based on fitting a 3D morphable model," *PAMI*, 25(9), 2003, in the following ways.

Shape is recovered directly, and not jointly with an estimation of texture. Shape is obtained from occluding contours or silhouettes, and not from the texture. Estimation of object texture is not required. However, texture can easily be obtained from the object after the shape is recovered using standard techniques. Our model-fitting uses binary silhouettes, and not image intensity errors. Our method does not require actual images per se. The method can use any other means of foreground/background segmentation of depth layer information. For example, silhouettes can be obtained with range sensors.

Furthermore, our silhouette-matching optimization is simpler, has fewer free parameters and is considerably faster, by a factor of approximately ten.

In our prior modeling method, an optimal arrangement of the cameras 600 was initially found by trial and error, and using our "intuition" as to which viewpoints are more informative for acquiring shape.

Here, we continue our invention.

It is now our goal to remove the guess-work from the viewpoint selection process, and determine an optimal geometry or view configuration for a given number of K cameras. For model building, our method used scans of male and female adult faces of various races and ages. The scans can be used to produce meshes. The number of points in each face mesh varies approximately from 50,000 to 100,000.

All scanned faces in the database are resampled to obtain point-to-point correspondences. Second, the resampled faces are aligned to a reference face to remove any variations in pose variation, or any misalignment during the scan. Third, we perform principal component analysis (PCA) on the database of aligned 3D faces to obtain eigenvectors of our shape model and their associated eigenvalues, i.e., variances of their implicit Gaussian distribution. This decomposition can be used to reconstruct new or existing faces through a linear combination of "eigenhead" basis functions, see generally, J. J. Atick, P. A. Griffin, and N. Redlich, "Statistical approach to shape from shading face surfaces from single 2D images," *Neural Computation*, 8(6) pp. 1321-1340, 1996.

An inspection of the PCA eigenvalue spectrum and the resulting shape reconstructions indicates that the first sixty eigenheads are sufficient for capturing most of the salient facial features of faces in the database. Therefore, the corresponding shape parameters $a_i$ are our optimization parameters.

An arbitrary face model M(a) produces a polygon mesh given a parameter vector $a=\{a_1, a_2, \ldots, a_n\}$. Input silhouette images are $S^k_{input}$, for $k=1, \ldots, K$. A similarity transformation T aligns a reference model face to a real 3D face. A silhouette image $S^k_{model}(a)$ is a rendered by projecting T(M(a)) onto an image plane using pose information in the $k^{th}$ silhouette image. The parameter vector a is estimated by minimizing a total penalty $$E(a) = \sum_{k=1}^{K} f(S^k_{input}, S^k_{model}(a)), \quad (1)$$

where the cost function $f$ measures a difference between two binary silhouettes. For the cost function $f$ in Equation (1), a simple difference metric between two binary silhouettes is the number of 'on' pixels when a pixel-wise exclusive-or (XOR) operation is applied.

To prioritize matching the correct pixels on occluding contours and to promote uniqueness so that the cost function $f$ has a global minimum, we impose a higher penalty for any mismatch near boundary pixels of the input silhouette. Specifically, $$f(S_{input}^k, S_{model}^k(a)) = \sum_i^H \sum_j^N c(i, j), \quad (2)$$

$$c(i, j) = \begin{cases} 0 & \text{if } S_{input}^k(i, j) S_{model}^k(a)(i, j), \\ d(i, j)^{-2} & \text{otherwise,} \end{cases}$$

$$d(i, j) = D(S^k)(I, j) + D(\tilde{S})(i, j),$$

where D(S) is a Euclidean distance transform of binary image S, and image S is an inverse image of image S. Note that the variable d represents a distance map from the silhouette contour. The variance can be determined after a preprocessing step. We call this cost function a boundary-weighted XOR. The cost function provides a simple and effective alternative to precise contour matching.

Consequently, there is no need for time consuming processing of correspondences with edge-linking, curve-fitting and distance computations between contours. Furthermore, the boundary-weighted XOR operations can be performed in hardware. Given the inherent complexity and nonlinearity of the cost function and no analytic gradients, we use a probabilistic downhill simplex method to minimize Equation (1).

Determining Optimal Viewpoints for 3D Face Modeling

We now continue our invention by describing a method to determine a set of optimal viewpoints for 3D face modeling using an arbitrary number K of cameras or 'viewpoints', for example, five or less. We describe how to 'prune' the space of all possible viewpoints, obtained by uniform tessellation of the view-sphere, based on clustering adjacent viewpoints using a silhouette difference or similarity metric obtained from shape projections. The selected set of aspect viewpoints is then examined using both our model-based method and a data-driven visual hull method.

Silhouette Generation

The silhouettes of a resampled face in our database are quite different from the silhouettes obtained from images of actual subjects. This is due to missing portions of the head and upper torso. To simulate silhouette images of actual subjects with our database, we use a fully scanned 3D head as our prototype head/torso.

Figure 1D:
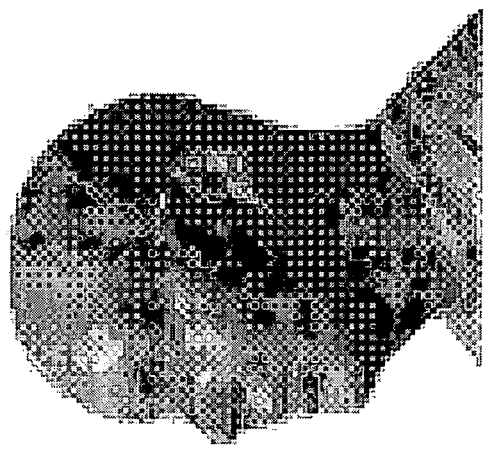
FIG. 1D is an image obtained by merging the resampled image of FIG. 1B with the model of FIG. 1C.
Figure 1C:
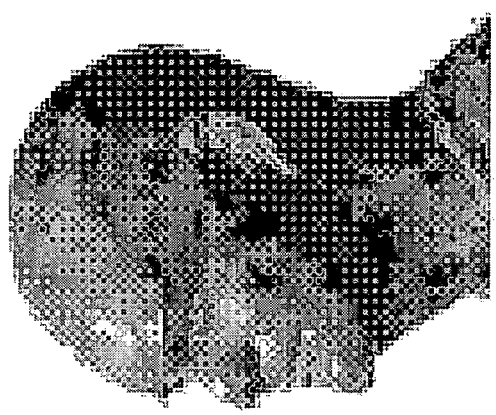
FIG. 1C is an image of a 3D model of a head obtained by scanning.
Figure 1B:
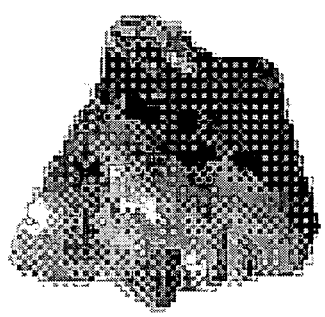
FIG. 1B is a resampled image of the face of FIG. 1A.
Figure 1A:
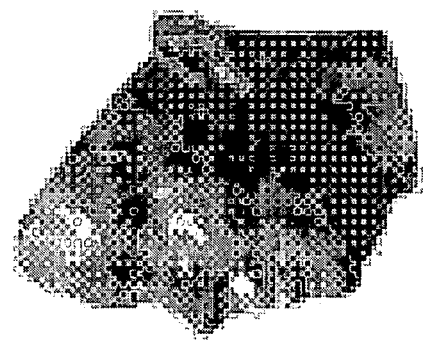
FIG. 1A is an image of an original face in a database.

FIG. 1A is an image of an original face in the database, FIG. 1B is an image of a resampled face, FIG. 1C is an image of a laser scanned full 'prototype' head, and FIG. 1D is an image of a rendered face obtained by merging the resampled face with the scanned full head.

The merging is done by aligning the facial region of the prototype head to the resampled face by smooth deformations, and "stitching" the head and face together to synthesize a "virtual" test subject, complete with full head and shoulders. Therefore, we can generate complete silhouette images with the same exact face shapes as in the database, while maintaining the proper geometry of the subjects.

This pre-processing step is only used in lieu of having complete head scans and can be omitted when complete subject scans are available. The process of "stitching" our 3D face models to one common head shape only highlights the critical facial area as the key "region-of-interest" in the subsequent analysis and optimization. By doing so, we are effectively indicating that non-critical areas, such as the back of the head, etc., are not important or salient for accurate reconstruction of the face area. The search methodology, however, can remain the same regardless of which areas are highlighted, i.e., marked as salient or not.

View-Sphere Tessellation

Figure 2B:
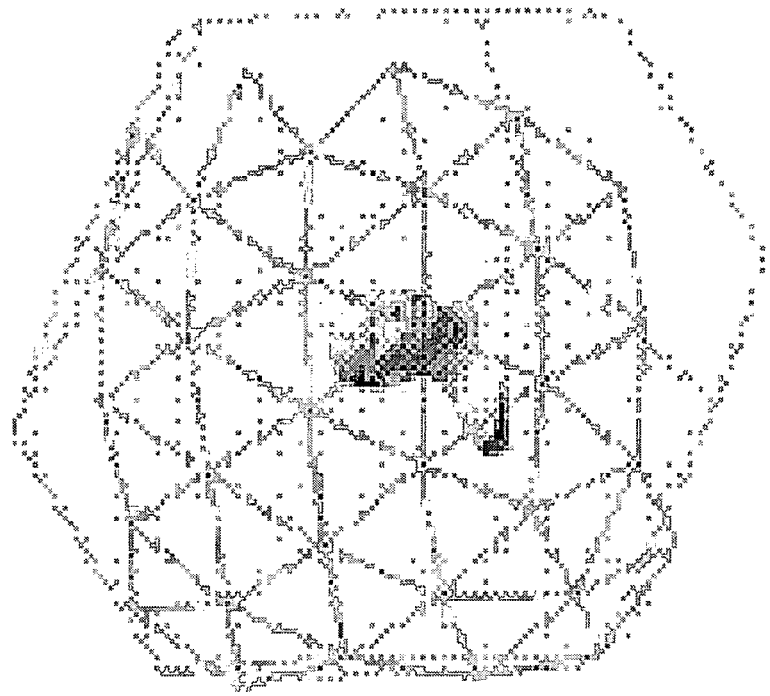
FIG. 2B is the tessellated view-sphere with discarded viewpoints.
Figure 2A:
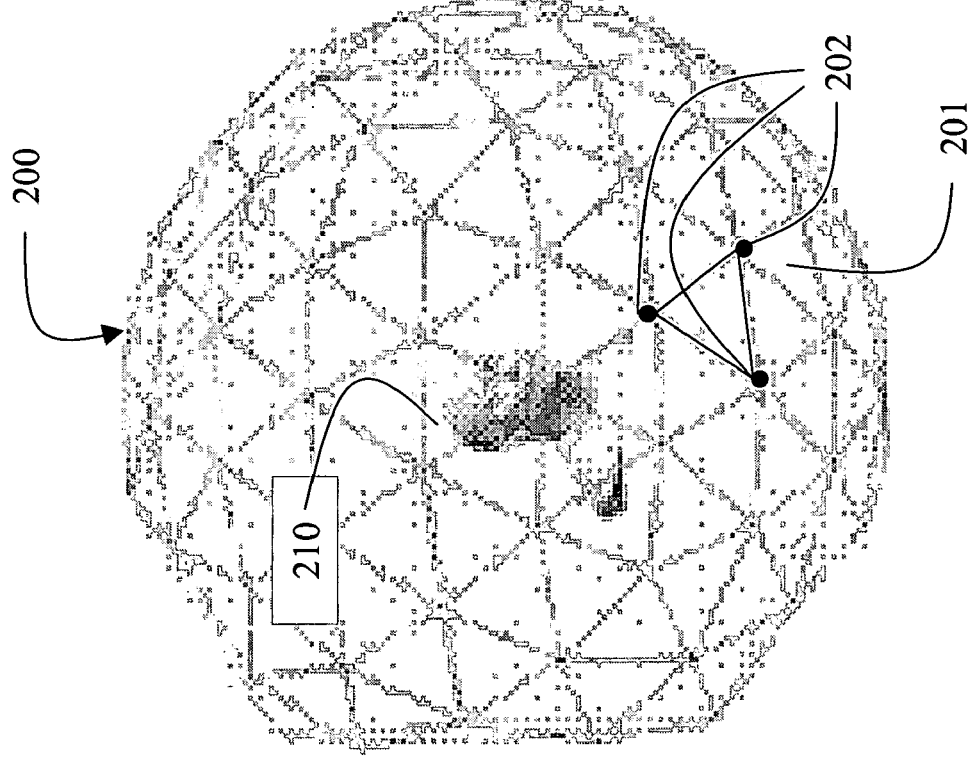
FIG. 2A is a tessellated view-sphere.
Figure 5:
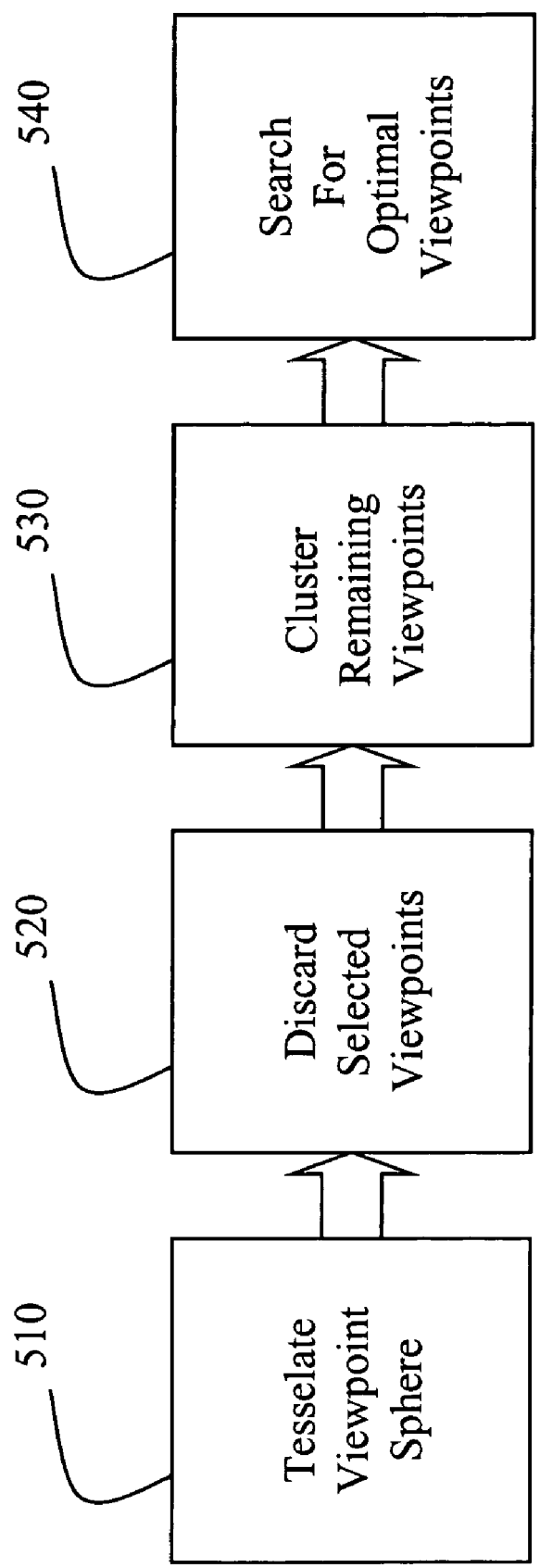
FIG. 5 is a block diagram of a method according to the invention.

As shown in FIG. 2A and FIG. 5, we tessellate 510 the view-sphere 200 uniformly with triangles using a subdivision of a dodecahedron around the subject 210. This procedure yields one-hundred-and-twenty triangles 201, which we call viewpoint cells. The vertices 202 of each triangle 201 are on a surface of the view-sphere 200.

As shown in FIG. 2B and FIG. 5, we discard 520 selected viewpoint cells. The discarded viewpoint cells include cells in the rear-hemisphere of the view-sphere, with respect to the camera, because the face is occluded from those viewpoints. We further discard the viewpoint cells which are above and below a predetermined elevation, because the corresponding viewpoints are unlikely or impractical physical locations for a camera. In our method, we restrict the elevation of viewpoints to ±45° from a central horizontal plane.

Furthermore, it is often very difficult to acquire accurate facial contour from oblique viewpoints, due to the occlusion and resulting confusion hair and shoulders. Finally, we discard an entire half of the remaining viewpoints due to an approximate bilateral symmetry of faces. This leaves forty-four viewpoints shown in FIG. 2B.

The remaining viewpoints still result in too many combinations or subsets of viewpoints. For example, to find eleven optimal viewpoints by an exhaustive search there are approximately $7 \times 10^9$ viewpoint combinations to evaluate. This is quite intractable. Therefore, we need to further reduce the search space even further.

Clustering Viewpoints

Our observation is that 2D silhouette images of two neighboring viewpoints are often substantially similar. Therefore, we measure a silhouette difference for two neighboring viewpoints and cluster 530 the two corresponding viewpoint cells when the silhouette difference is less than a predetermined threshold.

A location of a group (cluster) of viewpoint cells can then be represented by the centroid of the cluster of viewpoint cells. More importantly, here we consider only the silhouette differences near the critical facial areas, e.g., nose, eyes, ears, chin, and mouth, because face shape recovery is not affected by the silhouette differences in other irrelevant areas, such as the shoulders.

For clustering, we first build a lookup table (D) that stores a partial or face-restricted XOR silhouette distance between every pair of viewpoints in the search space. Initially, every viewpoint is considered a cluster, and the aspect viewpoint of the cluster is the viewpoint itself.

We define the silhouette difference between two clusters by the silhouette distance between their aspect viewpoints. That information is pre-computed and stored in the look-up table D. We find the two neighbor clusters that have a minimum silhouette difference among all the other neighbor clusters and merge these clusters. After merging two clusters, we determine a new aspect viewpoint for the new merged cluster. The new aspect viewpoint is the viewpoint that has the minimum value for the maximum silhouette difference compared to all the other viewpoints in the same cluster. We repeat this process until a predetermined number of clusters remain.

Figure 3:
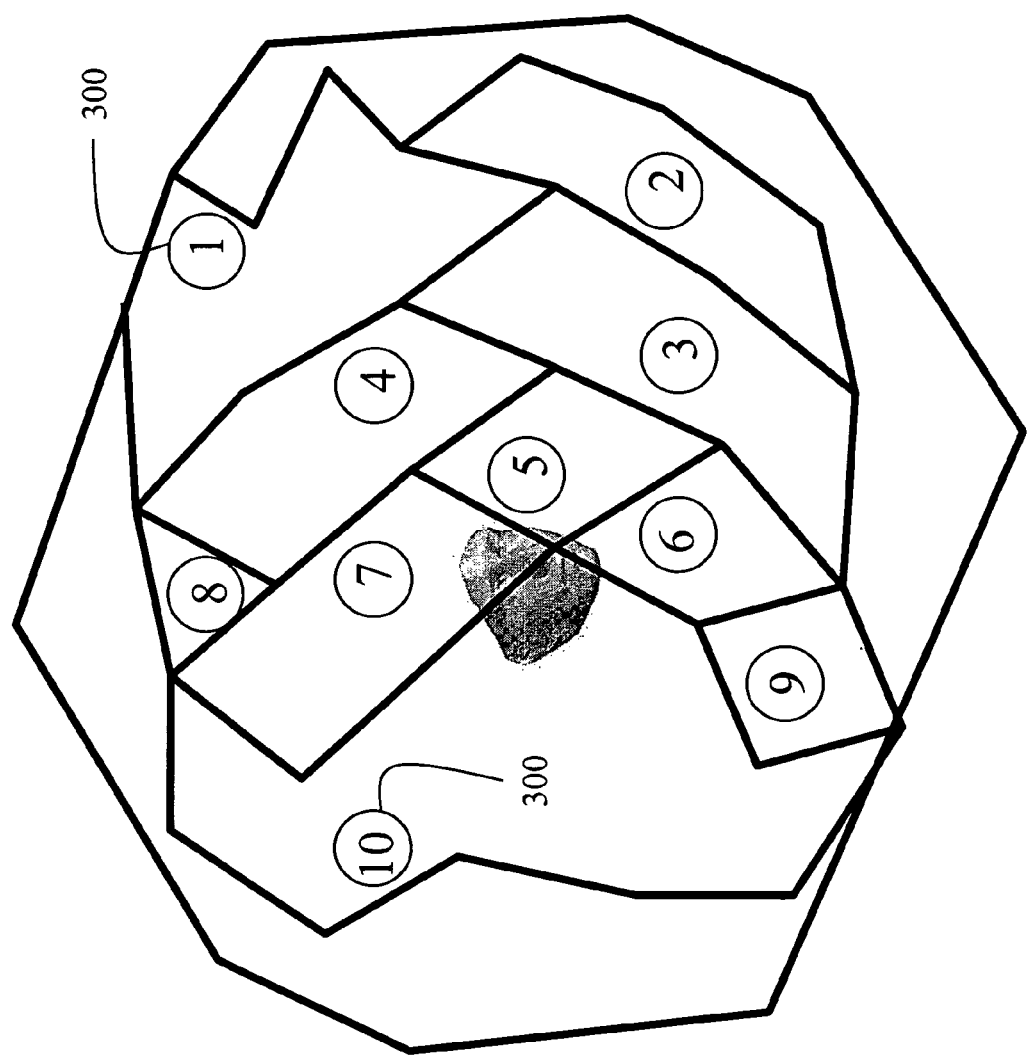
FIG. 3 is a view-sphere with clustered viewpoints.

FIG. 3 shows ten clusters 1-10 and approximate corresponding aspect viewpoints 300 obtained using the clustering step 530. Note that the resulting aspect viewpoints are not necessarily geometric centroids of clusters, but rather, viewpoints with a minimum silhouette difference to other members of the cluster.

To circumvent any subject-dependency and to generalize this clustering, all the entries in our lookup table D are generated by averaging the pair-wise silhouette difference distances for fifty different synthesized heads in our database.

Table A gives the coordinates of the aspect viewpoints 1-10 wherein azimuths of {90°, 0°, +90°} correspond to {left, front, right} directions in a head-centered reference frame.

TABLE A

| View # | Azimuth ° | Elevation ° |
|---|---|---|
| 1 | 3.4 | 40.4 |
| 2 | 7.6 | −15.5 |
| 3 | 28.2 | −17.0 |
| 4 | 31.4 | 18.9 |
| 5 | 40.0 | 0.9 |
| 6 | 48.3 | −16.5 |
| 7 | 52.2 | 16.8 |
| 8 | 55.1 | 39.4 |
| 9 | 63.1 | −30.2 |
| 10 | 85.9 | 17.7 |

Figure 4:
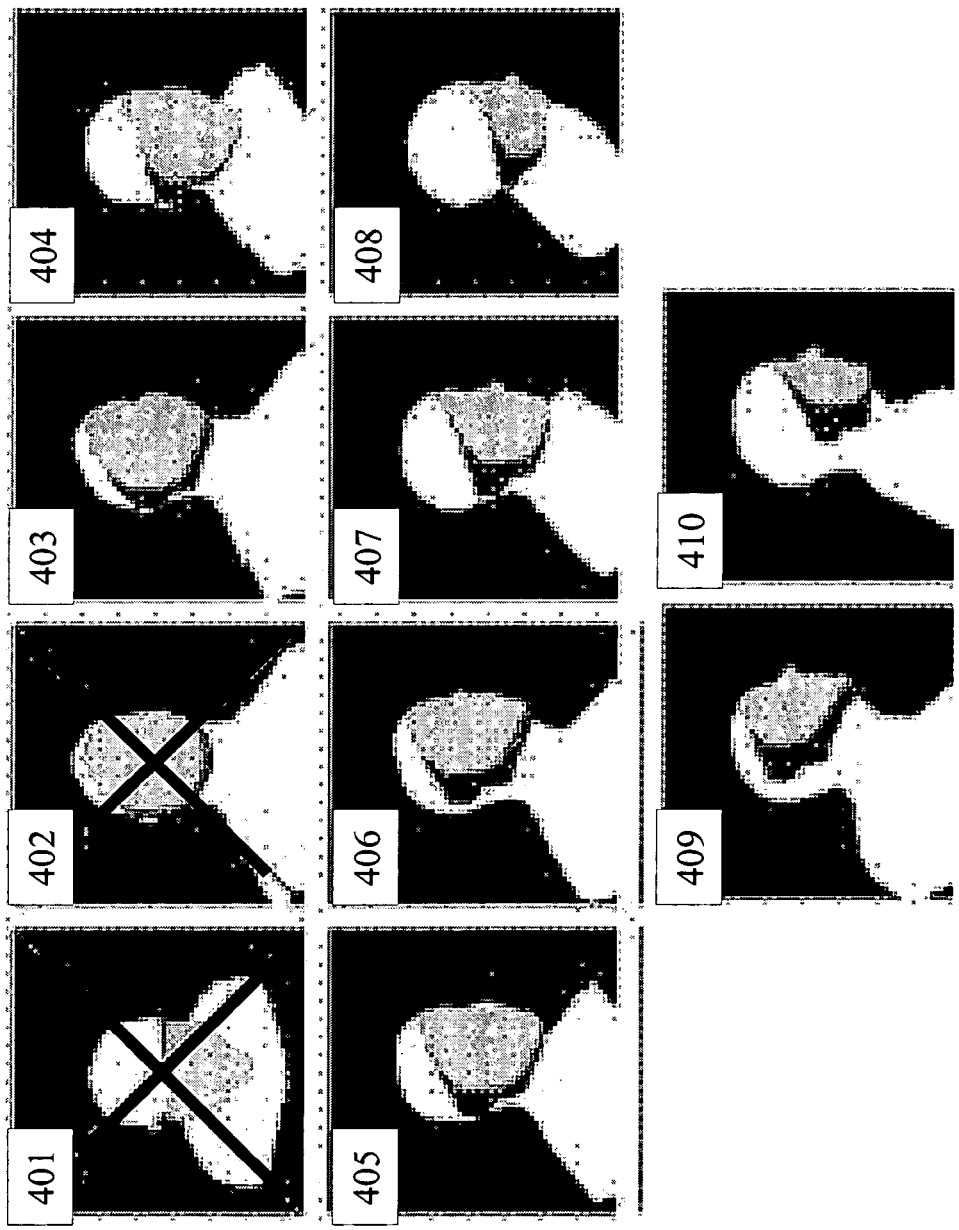
FIG. 4 are silhouettes obtained from ten aspect viewpoints.

FIG. 4 shows the corresponding silhouettes 401-410 obtained form the ten aspect viewpoints, along with the model silhouette, and the critical facial area used for error evaluation. All reconstruction errors are confined to the critical facial area. Extraneous inputs from hair and shoulders are ignored. We discard view 1 in FIG. 3. Because of the downward angle, the corresponding face silhouette 401 is partially hidden and confounded by the torso. View 2 is also discarded because frontal veiwpoints offer very little occluding contour as constraints for shape recovery although frontal viewpoints are preferred for acquiring facial texture.

Determining Optimal Viewpoints

Given the remaining eight aspect viewpoints 3-10, we search 540 exhaustively for the optimal subset of K≦8 viewpoints, which for each case K, yield a closest 3D shape reconstruction with respect to the original face, using the K silhouettes for the shape recovery process. The default reconstruction method is our model-based (eigenhead) 3D face shape recovery method, as described in the related U.S. patent application Ser. No. 10/636,355.

For comparison, we also tested a purely data-driven method using a visual hull construction method. It should be noted that visual hulls by themselves are not suited for accurate reconstructions, even with hundreds of viewpoints. Our goal is to show that a greedy search based on a data-driven method selects a similar set of optimal viewpoints.

For the set of optimal viewpoints to be relevant for general purpose face modeling and recognition, the viewpoints should apply for generic faces of all kinds, e.g., gender, ethnicity, age. Therefore, optimality should be independent of the subject. To this end, we used a representative subset of twenty-five individuals from our database and based our optimal viewpoint selection on the con-figurations that minimized the total or averaged error for all subjects.

When we recover a 3D shape from silhouette images, we require a metric that measures the error between the ground truth and the reconstructed 3D geometry. Because our focus is on the facial area of the recovered shape, we need a metric that measures the difference in the critical facial area of the recovered shape and the original face. The basic approach for this error measurement is as follows.

The first step is to find a dense point set on the facial area of the recovered face geometry. With an eigenhead shape model, we find the facial points for our model via a mesh parameterization.

However, it is not trivial to find the same facial points on a visual hull. We use a ray casting method to find the facial points on the visual hull. Because we have images of the original 3D heads, which we use to generate the input silhouette images from facial points on the original head, we cast rays toward the visual hull and get corresponding samples on a surface of the visual hull.

After we obtain the facial points, we use the same ray casting scheme to get the corresponding samples on the surface of a ground truth mesh. We measure the L2 distances of the facial points on the recovered face and the corresponding points on the ground truth and use the L2 distances as the 3D error metric for the facial area.

Model-Based Reconstructions

We performed the exhaustive search 540 on the eight remaining aspect viewpoints in FIG. 4 to find the set of optimal subset of viewpoints for K={1, 2, 3, 4, 5} cameras. Therefore, the total number of possible reconstructions is 5450. To remove the data dependency inherent in a single individual's reconstruction error, we use the average reconstruction error of twenty-five subjects that are selected randomly from the database.

The results are presented in Table B, which shows the set of optimal viewpoints for K={1, 2, 3, 4, 5}, and the corresponding minimum average reconstruction errors, refer to Table A for exact coordinates of the aspect viewpoints.

TABLE B

| K | Best Viewpoints | Best Error | Standard Deviation | Error Mean | Error Std Dev |
|---|---|---|---|---|---|
| 1 | 4 | 40.7 | 12.4 | 45.0 | 3.3 |
| 2 | 3, 10 | 31.9 | 8.6 | 37.6 | 4.3 |
| 3 | 3, 5, 10 | 28.2 | 6.2 | 31.7 | 2.9 |
| 4 | 3, 4, 9, 10 | 26.8 | 6.2 | 31.7 | 2.9 |
| 5 | 3, 4, 7, 8, 10 | 26.6 | 7.1 | 30.2 | 2.2 |

The standard deviation of the individual errors for all twenty-five subjects under the best configuration is also presented. The average error means and average error standard deviations are based on the average reconstruction errors across all viewpoints. Both tend to decrease with increasing K as expected because more viewpoints provide more constraints.

Visual Hull Reconstructions

Using the same search strategy as described above for the 3D model based method, we now evaluate the visual hull constructions obtained from the given subset of silhouette images and compare the results to the ground truth.

Table C shows the optimal viewpoints for K={2, 3, 4, 5} and the corresponding error values. The visual hull from a single silhouette (K=1) has no finite volume, and is omitted.

TABLE C

| K | Best Viewpoints | Best Error | Standard Deviation | Error Mean | Error Std Dev |
|---|---|---|---|---|---|
| 2 | 3, 10 | 418.7 | 26.1 | 847.7 | 400.4 |
| 3 | 3, 9, 10 | 406.0 | 24.7 | 643.5 | 246.9 |
| 4 | 3, 8, 9, 10 | 399.9 | 25.8 | 541.0 | 163.3 |
| 5 | 3, 4, 8, 9, 10 | 398.3 | 25.5 | 481.2 | 108.9 |

Note that a visual hull reconstruction, especially one from a small number of images, is not a very accurate representation. Unlike our model-based results, here the reconstruction quality is much more view-dependent than subject-dependent. However the view dependency decreases significantly as the number of viewpoints (K) increases, see the error standard deviations. For both methods, viewpoints 3 and 10 seem to be the most informative.

EFFECT OF THE INVENTION

The method according to the invention determines a set of optimal viewpoints for 3D face modeling, in particular, methods that recover shape from silhouettes. The invention provides useful guidelines for designing 3D face recognition systems and are in agreement with existing practice and intuition. For example, the most salient viewpoint 3 corresponds very closely with the established biometric standards '¾ view', which is used for many identification photographs, and viewpoint 10 corresponds to the profile view used in 'mugshot' photographs. Our results indicate that reconstructions do not improve significantly beyond four to five viewpoints, see the best errors listed in Tables B and C.

It is possible to incorporate additional physical and operational constraints into our method. For example, although a direct frontal viewpoint is not very salient for shape, it is the preferred view for capturing texture, hence this view is used by nearly all 2D face recognition systems. This viewpoint can be pre-selected before the search.

In video-based face acquisition, motion of the subject and pose variation provide multiple virtual viewpoints, even though the camera is fixed. Therefore, our method can be applied to a sequence of images in a surveillance video to select automatically the optimal poses, i.e., video frames that are best for face recognition.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A method for determining an optimal set of viewpoints to construct a 3D shape of a face from 2D images acquired at the optimal set of viewpoints, comprising:
    tessellating a view-sphere with a plurality of viewpoint cells, where the face is located at an approximate center of the view-sphere;
    discarding selected viewpoint cells;
    clustering remaining viewpoint cells to a predetermined number of viewpoint cells according to a silhouette difference metric determined from the 2D images; and
    searching the predetermined number of viewpoint cells for the optimal set of viewpoints.

2. The method of claim 1, in which the tessellation uses triangles.

3. The method of claim 1, in which the tessellation is a uniform subdivision of a dodecahedron.

4. The method of claim 1, in which the selected viewpoint cells include viewpoint cells in a rear-hemisphere of the view-sphere.

5. The method of claim 1, in which the selected viewpoint cells include viewpoint cells above and below a predetermined elevation.

6. The method of claim 5, in which the predetermined elevation is ±45° from a central horizontal plane of the view-sphere.

7. The method of claim 1, in which the selected viewpoint cells include viewpoint cells of half of the face due to an approximate bilateral symmetry of two halves of the face.

8. The method of claim 1, in which the silhouette difference metric is measured for each pair of viewpoint cells.

9. The method of claim 1, in which the predetermined number of viewpoint cells is ten.

10. The method of claim 1, in which a location of the viewpoint cells is determined by a centroid of the cluster of viewpoint cells.

11. The method of claim 1, in which only the silhouette differences near critical facial areas are considered.

12. The method of claim 11, in which the critical facial areas include a nose, eyes, ears, a chin, and a mouth.

13. The method of claim 1, in which the silhouette distances are stored in a precomputed look-up table.

14. The method of claim 1, in which the searching is exhaustive.

15. The method of claim 1, in which the set of optimal viewpoint cells is applied to a sequence of images in a video to select automatically optimal poses for face modeling.

16. The method of claim 1, in which the set of optimal viewpoint cells is applied to a sequence of images in a video to select automatically optimal poses for face recognition.

17. The method of claim 1, in which the set of optimal viewpoint cells is used to construct the 3D model of the face from 2D images acquired at the optimal set of viewpoints.

18. The method of claim 1, in which the searching is a combinatorial search of all possible subsets of the optimal set of viewpoint cells.

19. The method of claim 1, in which optimality is defined by a minimum reconstruction error between an input face and the 3D model of the face.

20. The method of claim 19, in which the minimum reconstruction error is based on a combination of shape and texture.

21. The method of claim 19, in which the minimum reconstruction error is based on an average of a plurality of faces.

* * * * *